UNITED STATES PATENT OFFICE.

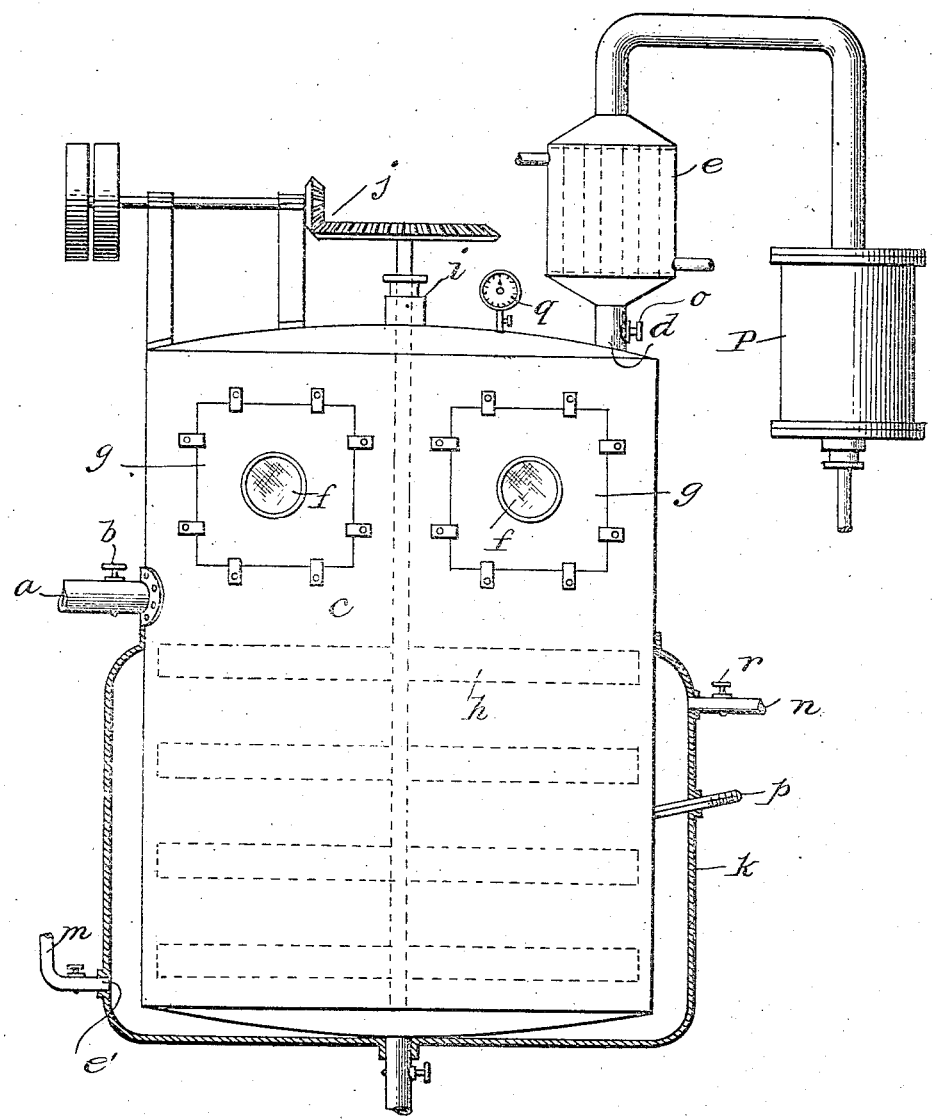

CHESTER EARL GRAY, OF EUREKA, CALIFORNIA.

PROCESS OF MANUFACTURING PRODUCTS FROM MILK AND CREAM.

1,219,291. Specification of Letters Patent. Patented Mar. 13, 1917.

Application filed December 13, 1910. Serial No. 597,028.

*To all whom it may concern:*

Be it known that I, CHESTER EARL GRAY, a citizen of the United States, residing at Eureka, county of Humboldt, and State of California, have invented certain new and useful Improvements in Processes of Manufacturing Products From Milk and Cream; and I do hereby declare the following to be a full, clear, and exact description of the same reference being had to the accompanying drawings, forming a part of this specification, and to the figures and letters of reference marked thereon.

It has been generally supposed and believed that changes in flavor taking place in milk and the products of milk, especially cream and butter, when held at ordinary temperature or at lower temperature as in refrigeration, were produced almost wholly by bacteria or enzym fermentation and the probability of changes which are strictly chemical and without the aid of either bacteria or enzyms has received very little attention. Furthermore the flavors produced by pasteurization and sterilization of milk and cream, which flavors are usually referred to as pasteurized, or oily have been taken as a matter of course, and conceded as inevitable. In other words it has been conceded that if milk or cream be pasteurized or sterilized the process naturally will produce certain flavors which in intensity depend largely on temperature and the length of time which the milk or cream is heated. Referring again to the holding of milk, cream and butter, I have found that when milk or cream was pasteurized at temperatures high enough to destroy enzym action or in case of butter where the butter was made from cream just after it had been pasteurized at high temperatures, that when these products were placed in cold storage at temperatures low enough to prevent bacterial action material changes in flavor still took place. To illustrate more fully I have held butter, made from cream which had just been pasteurized at 185° F., in cold storage at —10 F., yet at this low temperature very pronounced undesirable flavors developed; flavors termed by butter judges as oily, fishy and decomposed fat. Again, cream pasteurized at temperatures sufficiently high to destroy all enzyms and especially cream high in fat content, when held at temperatures low enough to practically inhibit the action of bacteria, in most cases, in a short period took on a very undesirable oily flavor. It has been found that where milk or cream is handled in rusty cans or any other utensils in the process of handling or manufacturing where iron compounds become mixed with the product, that undesirable flavors develop in a much shorter time than where these compounds are not present. The intentional addition of various metallic salts as iron, copper, etc., has given similar results. It is not known that these salts accelerate the action of enzyms or the growth of bacteria, but rather it has been found that these salts, especially salts of copper, greatly retard the bacterial growth. From this it seems reasonable to believe that there are changes taking place which are not due to either bacterial or enzym action. The nature of the flavors indicates very strongly that an oxidation takes place, in other words the product of oxidized fats resembles in flavor very much the flavor produced in the milk, cream or butter. The fact that these flavors develop more rapidly in the presence of metallic compounds would indicate that these compounds act as catalytic agents, bringing about a more rapid oxidation than would otherwise take place. At the present time it does not appear practicable to handle milk and cream in non-metallic containers and manufacturing apparatus. In other words delivery containers, cream separators, pasteurizers, ripening vats with cooling devices, and churns and working devices of strictly non-metallic material are not considered feasible. Moreover, if these were practicable eliminating metallic salts would not, in all probability, produce entirely satisfactory results. Rogers and Gray, "The Influence of the Acidity of Cream on the Flavor of Butter." (B. A. I., Bulletin 114, U. S. Dept. of Agriculture), have found that acid in cream has an influence on the development of undesirable flavors in butter; that butter may be made from sweet cream or unripened cream which does not develop in storage the flavors of oxidation to a marked degree. As in the case of metallic salts or metallic compounds it seems very probable that the acid also acts as a catalytic agent. While making butter from sweet cream gives very satisfactory results, so far as the keeping qualities are concerned such butter is not wholly satisfactory on account of its being without the flavors characteristic of high class butter. Referring to milk and cream especially, the problem has been to secure these products in such condition that they are not changed in flavor, especially under low temperatures as in refrigerating and also when heated to high temperatures as in pasteurization or sterilization. In view of the indication that there are undoubtedly changes taking place which are strictly chemical in nature and not due to enzym or bacterial action and that these changes are without doubt due to oxidation of some of the constituents, especially the fat, a careful consideration of the association of milk and cream with oxygen may be advisable.

At the time the milk is drawn from the cow it passes to the pail in such manner as to be continuously mixed with air. The very nature of hand milking is such that air is very intimately incorporated with the milk. With the milking machine, while the tendency to incorporate air may be slightly less, yet air is very intimately incorporated. All of the processes of straining, filtering and pouring the milk from one container to another tend to incorporate air. Practically all the devices for heating and cooling milk and cream are such that air is again incorporated. Considering the centrifugal separator, both the cream and milk are thrown through the air from the revolving bowl in a very finely divided condition against the collecting covers of the separator. It would be difficult to devise a machine of greater apparent efficiency for incorporating air with milk or cream than the centrifugal separator. On account of the viscosity of cream much air is retained in this product. This is very readily demonstrated, as will be later described. With practically all of the milk and cream pasteurizers and ripening vats the milk or cream is more or less intimately mixed with the air. The process of churning is also a process of very thoroughly mixing and incorporating air. In most all instances in churning the cream reaches a condition where air is incorporated to the extent that the total volume of the mixture is more than ⅓ greater than the original volume of the cream. As the churning progresses some of the air is given up but much is retained in the finished butter. By the process of working the butter more or less air may be incorporated. To further demonstrate that air is actually incorporated in milk, cream and butter I have conducted the following experiments: An ordinary 400 c. c. beaker about half full of fresh cream was placed in a bell jar and the air slowly exhausted. Bubbles of air immediately began rising through the cream and the volume began expanding. By the time a vacuum of 28 inches was produced the upper ⅔ of the volume of cream appeared to be foam and the total volume almost filled the beaker. Fresh milk treated in the same manner acted similarly to the cream, however the volume did not increase to the extent of that of the cream and less foam was produced. Undoubtedly this difference was due to a difference in the viscosity of the two products, less air having been retained in the fresh milk. A print of butter was placed in a bell jar and covered completely with freshly distilled water. The air was then slowly exhausted. Small bubbles of air were very soon noticeable all over the surface of the butter and as the vacuum increased the bubbles of air became larger and finally passed up through the water. Cracks were noticeable extending in various directions through the print of butter and the bubbles of air continued to rise through the water. By the time a 28 inch vacuum was produced the print of butter was full of cracks which were produced by the expansion and liberation of the incorporated air. Attempts were made to pack butter in glass jars and then pump a vacuum on the jar with the intension of sealing the butter in partial vacuum, but this was found impracticable, due to the fact that the expansion of the incorporated air forced the butter out of the containers. From this I have conclusive evidence that air is incorporated with milk, cream and butter and apparently we have sufficient reasons to believe that the air exists in a very finely divided condition and in very close proximity to the other constituents. Being in possession of this information, most of which comes from my own investigation of dairy products I have devised a new and improved process for milk and its products, which process has for its basis the exclusion of oxygen, especially the intimately incorporated oxygen. By this process I am able to produce products of superior quality.

The object of this invention is to provide a process for retarding the decomposition of the constituents of milk and cream products, especially cream, pasteurized cream, sterilized cream, milk powder and butter.

It consists substantially in removing the free oxygen, especially the intimately incorporated oxygen, by subjecting the milk and cream under suitable conditions to a vacuum and subsequently carrying on the various processes of treatment or manufacturing as separation, homogenizing, pasteurization, sterilization, churning, working and transferring to containers either in vacuum in the presence of non-oxidizing gases, as nitrogen or carbon dioxid, or in the presence of air but without the material re-incorporation of free oxygen.

The means and devices for carrying out the new processes may be of various kinds. One suitable form of apparatus is shown diagrammatically in the accompanying drawing. The construction and operation of the apparatus is as follows: (a) is an opening regulated by the valve (b) through which the milk and cream may be introduced into the vacuum chamber (c). (d) is an opening communicating with the vacuum pump (P) through the tubular condenser (e), the function of which will be later described. The chamber (c) is filled not more than half full of cream or milk to be treated, the additional space being left for foam and expansion. The air pressure is now greatly reduced by the vacuum pump, the pressure being indicated by the combination vacuum and pressure gage (q). The action of the milk or cream may be watched through the glass windows (f) in the doors (g). The milk may be agitated by the agitating device (h) which enters the vacuum chamber through the stuffing box (i) and is driven by the gearing (j). The vacuum chamber is surrounded by the jacket (k). Heat is applied to the milk or cream, preferably by circulating hot water through the jacket, the heating medium being introduced at the point (e') through the pipe (m), and being discharged at the outlet (n), which is regulated by the valve (r). The heat is applied as has just been described until a temperature above the boiling point of the milk or cream, at the vacuum maintained, is reached. The temperature is noted by the thermometer (p). The process of boiling under vacuum is continued until practically all of the free oxygen is removed. All vapor is condensed by the condenser which discharges the condensed liquid back into the milk or cream in the chamber, thereby preventing a change in the composition, especially the water content of the product being treated.

It has been my practice to treat milk and cream under a vacuum of 28 inches for a period of thirty minutes, during which time the product boils slowly and is continually stirred by means of the agitating device. At the end of this period the free oxygen has been sufficiently removed so that the products of oxidation in the final products are not noticeable. Milk or cream is now ready to be pasteurized, sterilized, churned, or converted into other products.

Referring especially to pasteurization and sterilization the milk or cream may be pasteurized or sterilized in the apparatus described by closing the valve (o) and applying heat in the jacket either by steam or hot water and stirring by means of the agitating device, all of which has been previously described. By applying steam under pressure in the jacket temperatures sufficiently high to produce sterile products, by single heating, may be produced. The temperature and pressure at all times may be noted by the thermometer and combination pressure and vacuum gage. After pasteurization or sterilization the milk or cream may be cooled by circulating water or other cooling medium through the jacket. It is not essential that the pasteurization or sterilization be carried on in the apparatus as described, but it may be conducted in any other suitable apparatus whereby the material incorporation of free oxygen is prevented, either by conducting the operation in vacuum, in the presence of non-oxidizing gases, or by careful handling under atmospheric conditions whereby air is not incorporated with the products to an extent sufficient to produce changes and undesirable flavors. To illustrate—I have demonstrated that cream after being treated to remove the free oxygen can be carefully transferred under atmospheric conditions to suitable containers; the containers then hermetically sealed and the cream sterilized by heating to 250° F. for thirty minutes. Such cream does not possess the undesirable flavors of ordinary cream sterilized in this manner, is not materially changed in flavor and is of very excellent quality. Referring to holding milk and cream especially at low temperatures, as under refrigeration, the milk and cream after being treated by my process either before, but preferably after pasteurization or sterilization, may be removed to suitable containers without the material incorporation of free oxygen and such milk or cream will keep for long periods without the development of flavors of oxidation products.

Referring especially to the separation of milk and cream after the removal of the free oxygen. This may be done by means of any centrifugal separator which is inclosed in a vacuum chamber. The centrifugal separator may be driven by an electric motor or other suitable device within the vacuum chamber or from external power applied to a shaft extending through a stuffing box into the vacuum chamber. Also the separation may be carried on in a similar manner but in the presence of non-oxidizing gases. Referring especially to butter making, the cream is preferably treated as has been described, pasteurized, cooled and ripened. During the ripening process enough air is introduced by agitating the cream in the presence of air to bring about a satisfactory development of the lactic acid producing organisms. Such organisms being introduced after pasteurization and cooling in the form of a culture ordinarily termed a starter. When the ripening has developed to the desired degree it is advisable to again remove the free oxygen from the cream by the process previously described. The cream is then cooled, to the desired temperature for churning by circulating cooling media through the jacket of the apparatus as previously described. When this temperature is reached the cream is introduced into a churn in a vacuum chamber. Most of the combined churns and butter workers may be used with satisfactory results. The churn and worker are driven by an electric motor or other suitable device within the chamber, or from external power to a shaft extending through a stuffing box into the vacuum chamber. Churning the cream and working the butter is carried on in the usual manner, excepting that when the vacuum is relieved and air is admitted to the chamber and churn, as in removing butter milk introducing wash water for the butter and salting the butter, etc., the vacuum chamber is preferably closed and a vacuum again pumped before disturbing the cream or butter. In washing the butter it is advisable to use water which has been freshly distilled or boiled and then reduced to the desired temperature without the re-incorporation of free oxygen. It is advisable to apply the salt in the form of brine which has been previously boiled and reduced to the desired temperature without the incorporation of free oxygen. After the butter is finished it may be removed from the churn and packed in any desired package without re-incorporation of free oxygen or it may be packed in containers and sealed under a partial vacuum.

For the reasons heretofore pointed out sealing butter under vacuum in containers is not practicable with butter made in the ordinary way.

Obviously, instead of having the churn and worker in a vacuum chamber, as has been described, the churn body may form a vacuum chamber. Again, instead of churning in vacuum the churning may be conducted in the presence of non-oxidizing gases.

Milk and cream after being treated to remove the free oxygen may be converted into other products, as ice cream, or cheese with good results. Also products of a nature similar to milk or cream, in that they contain free oxygen which changes the composition and flavor, may be treated in a manner similar to that described, with advantageous results.

It is obvious that with the apparatus illustrated cream may be purified for butter making, etc., inasmuch as when subjected to a vacuum and heat which will boil it at the low pressure maintained in the chamber, not only will the free oxygen be drawn off with the vapor, but the vapor will carry off with it other undesirable substances which may have developed in the cream, especially gases and volatile substances. Under such circumstances it will be understood, of course, that the vapor is not returned to the cream when condensed and it is not essential that it be condensed save for the advantages to be secured thereby in protecting the apparatus and assisting in maintaining a proper degree of vacuum.

After the removal of the incorporated free oxygen the further treatment by churning, freezing, etc., results in a change in the physical condition, whereby free oxygen will not readily become incorporated therein or will not produce more than superficial chemical changes with the result that the product may be kept indefinitely with the exercise of only reasonable care.

Having thus described my invention, what I claim as new and desire to secure by Letters Patent of the United States is:

1. The process of manufacturing products from milk and cream, which consists in subjecting the same to rarefied conditions and heat to withdraw the incorporated oxygen and in providing the substance with a percentage of water substantially corresponding to the percentage withdrawn in the process whereby the final product has a substantially normal aqueous content.

2. The process of manufacturing products from milk and cream, which consists in heating the milk and cream, withdrawing the incorporated oxygen and aqueous vapor set free by the heat and restoring the aqueous content to the liquid whereby the relative proportions of liquid and solids remain substantially unchanged.

3. The process of manufacturing products from milk and cream, which consists in subjecting the milk and cream to rarefied conditions and heat to withdraw the incorporated oxygen, and in restoring to the liquid substantially the percentage of aqueous vapor carried off in the process.

4. The process of manufacturing products from milk and cream, which consists in subjecting the same to rarefied conditions and heat, withdrawing the incorporated oxygen, and restoring to the liquid substantially the percentage of aqueous vapor carried off in the process, and finally agitating the product under non-oxidizing conditions to change its physical condition.

5. The process of manufacturing products from milk and cream, which consists in subjecting the same to rarefied conditions and heat, withdrawing the incorporated oxygen and restoring to the liquid substantially the percentage of aqueous vapor carried off in the process and in reducing the temperature and agitating the oxygen freed milk and cream under non-oxidizing conditions.

CHESTER EARL GRAY.

Witnesses:
FRANK NAZRO,
C. M. GEORGESON.